United States Patent
Schneider

(10) Patent No.: US 8,437,472 B2
(45) Date of Patent: May 7, 2013

(54) STRENGTHENED KEY SCHEDULE FOR ARCFOUR

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 693 days.

(21) Appl. No.: 12/395,101

(22) Filed: Feb. 27, 2009

(65) Prior Publication Data

US 2010/0220855 A1 Sep. 2, 2010

(51) Int. Cl.
*H04L 29/06* (2006.01)
(52) U.S. Cl.
USPC .............. 380/42; 380/37; 380/44; 380/255; 380/277
(58) Field of Classification Search .............. 380/42, 380/44, 255, 37, 277
See application file for complete search history.

(56) References Cited

U.S. PATENT DOCUMENTS

| | | | |
|---|---|---|---|
| 6,438,666 B2 * | 8/2002 | Cassagnol et al. | 711/163 |
| 7,634,086 B2 * | 12/2009 | Kim et al. | 380/28 |
| 2002/0037079 A1 * | 3/2002 | Duval | 380/37 |
| 2002/0191790 A1 * | 12/2002 | Anand et al. | 380/255 |
| 2002/0191793 A1 * | 12/2002 | Anand et al. | 380/255 |
| 2003/0018891 A1 * | 1/2003 | Hall et al. | 713/160 |
| 2004/0005061 A1 * | 1/2004 | Buer et al. | 380/282 |
| 2004/0015610 A1 * | 1/2004 | Treadwell | 709/246 |
| 2004/0131182 A1 * | 7/2004 | Rogaway | 380/37 |
| 2004/0133795 A1 * | 7/2004 | Murray | 713/200 |
| 2005/0063542 A1 * | 3/2005 | Ryu | 380/259 |
| 2005/0237580 A1 * | 10/2005 | Coleman et al. | 358/462 |
| 2005/0238260 A1 * | 10/2005 | Coleman et al. | 382/313 |
| 2008/0112564 A1 * | 5/2008 | Vanderstraeten | 380/243 |
| 2009/0196416 A1 * | 8/2009 | Minematsu | 380/28 |

OTHER PUBLICATIONS

Espacenet search, Espacenet Result list, Sep. 2011.*
Wikipedia, "RC4", last modified Jan. 2, 2009, accessed at: http://en.wikipedia.org/wiki/Arcfour, accessed Jan. 5, 2009, 7 pages.

* cited by examiner

*Primary Examiner* — Andy Rao
*Assistant Examiner* — Shan Elahi
(74) *Attorney, Agent, or Firm* — Lowenstein Sandler LLP

(57) ABSTRACT

Some embodiments of a method and an apparatus to strengthen key schedule for arcfour have been presented. In one embodiment, an S array of a predetermined size is initialized. The S array is usable in a key generating process of arcfour encryption. The key generation process is extended to generate keys, which are substantially random and substantially unbiased. Using the keys generated, a stream cipher performs arcfour encryption on plaintext data to output ciphertext data.

20 Claims, 4 Drawing Sheets

STRENGTHENED KEY SCHEDULE FOR ARCFOUR

TECHNICAL FIELD

Embodiments of the present invention relate to data encryption, and more specifically to strengthened key schedule for arcfour.

BACKGROUND

As the use of internet becomes more and more popular, many transactions are being carried out online, such as, for example, banking transactions, purchases, access of personal records (e.g., medical records, academic records, etc.). Frequently, personal or private information (e.g., account numbers, passwords, personal messages, etc.) is sent via public networks, such as the Internet. To protect these personal or private information, various encryption techniques are often used to encrypt these personal or private information before sending it over the public networks.

One conventional data encryption technique is arcfour. A conventional arcfour stream cipher is generally fast and simple, but its simple key scheduling algorithm makes the encryption vulnerable to equivalent key recovery attacks. Furthermore, arcfour does not natively support per-message nonces to ensure that messages are enciphered using different key streams.

According to one conventional approach, arcfour is rekeyed by using an iterative method, running over a key interpreted as a sequence of unsigned quantities in the range of 0 to 255. The current state of the stream cipher is stored in an array of 256 unsigned quantities in the range of 0 to 255. In addition, the array includes two additional unsigned quantities in the range of 0 to 255, which are used to index the array. Conventionally, this array is referred to as an S array, and the two indices are referred to as i and j.

One conventional arcfour is keyed by initializing the S array to contain the sequence of integers, 0 through 255 in order, i.e., S[0]=0, S[1]=1, . . . , and S[255]=255; and j is set to 0. The key is interpreted as a sequence of byte values, repeated as necessary to form a sequence of 256 unsigned values in the range of 0 to 255, which may be referred to as a K array. Then i is iterated through the sequence of values of 0 through 255, and for each value, the sum of S[i] and K[i] is added to the value of j, and the result is masked to 8 bits. Then the $i^{th}$ and $j^{th}$ entries of S are swapped. After the iterations, i and j are set to zero. Bytes are generated from this by incrementing i and keeping the low eight (8) bits, adding S[i] to j, and again, keeping the low 8 bits. The $i^{th}$ and $j^{th}$ elements of the S array are swapped, and the S[i]+S[j] (mod 256) element of the S array is returned.

The operations of the above conventional arcfour stream cipher are simple and quick. Unfortunately, in the key setup as given, the value of j evolves as a function of the sum of the key bytes up to that point. This dependence shows up in the output, which is biased enough to potentially allow others to reconstruct the keys from the first several output bytes.

BRIEF DESCRIPTION OF THE DRAWINGS

The present invention is illustrated by way of example, and not by way of limitation, in the figures of the accompanying drawings and in which.

DETAILED DESCRIPTION

Figure 1:
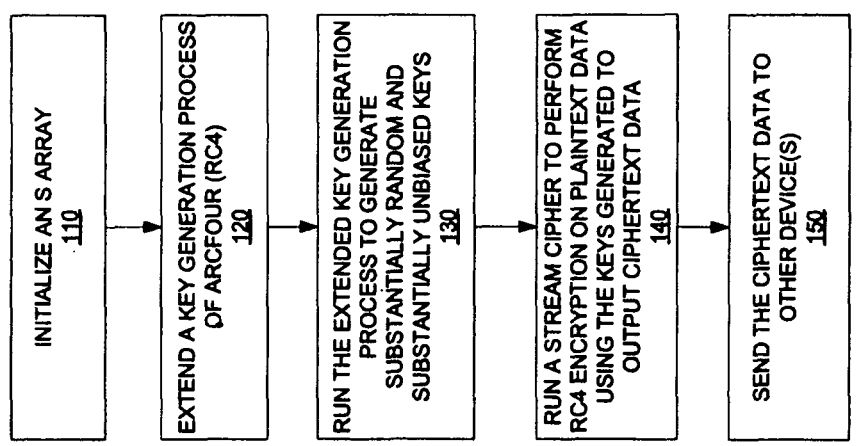
FIG. 1 illustrates a flow diagram of one embodiment of a method to encrypt data.

Described herein are some embodiments of a method and an apparatus to strengthen key schedule for arcfour. In one embodiment, an S array of a predetermined size (e.g., a 256-entry array) is initialized. The S array is usable in a key generating process of arcfour. The key generation process is extended to generate keys, which are substantially random and substantially unbiased. Using the keys generated, a stream cipher performs arcfour encryption on plaintext data to output ciphertext data. More details of some embodiments of the method and apparatus to strengthen the key schedule for arcfour are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a method to encrypt data. The method may be performed by processing logic that may comprise hardware (e.g., circuitry, dedicated logic, programmable logic, microcode, etc.), software (such as instructions run on a processing device), firmware, or a combination thereof. For instance, the method may be performed by the arcfour encrypting machine 200 illustrated in FIG. 2 in some embodiments.

Initially, processing logic initializes an S array to prepare for key generation (processing block 110). In some embodiments, the S array has 256 entries, plus two more entries in the range of 0 to 255 to index the S array. The two indices are usually referred to as i and j. The S array may store the current states of a stream cipher. Processing logic further extends a key generation process of arcfour (processing block 120). In one embodiment, processing logic extends the key generation process by using a first key to generate a 256-entry key array indirectly. In addition to, or as an alternative to, indirectly generating the 256-entry key array, processing logic may mix the key array into the S array multiple times and/or in different ways to extend the key generation process. For instance, the key generator 230 may mix the key array into the S array in an iterative way. Processing logic then runs the extended key generation process to generate a set of substantially random and substantially unbiased keys (processing block 130).

Using the keys generated, processing logic runs the stream cipher to encrypt plaintext data to generate ciphertext data (processing block 140). In some embodiments, the plaintext data may be received via a graphical user interface (GUI) of a network access application (e.g., a web browser, an electronic mail application, etc.). Finally, processing logic sends the ciphertext data to one or more devices via a network, such as the Internet (processing block 150). The one or more devices receiving the ciphertext data may include a cellular telephone, a personal digital assistant, a server, a personal computer, etc. In an alternative embodiment, the ciphertext is stored in a machine-readable storage medium, and may later be processed by the same or a different device to recover the original plaintext at a later time. By extending the key generation process, the keys generated are substantially random and substantially unbiased. As a result, it becomes more difficult to reconstruct the keys by analyzing the ciphertext. Hence, the protection of the data is strengthened.

Figure 2:
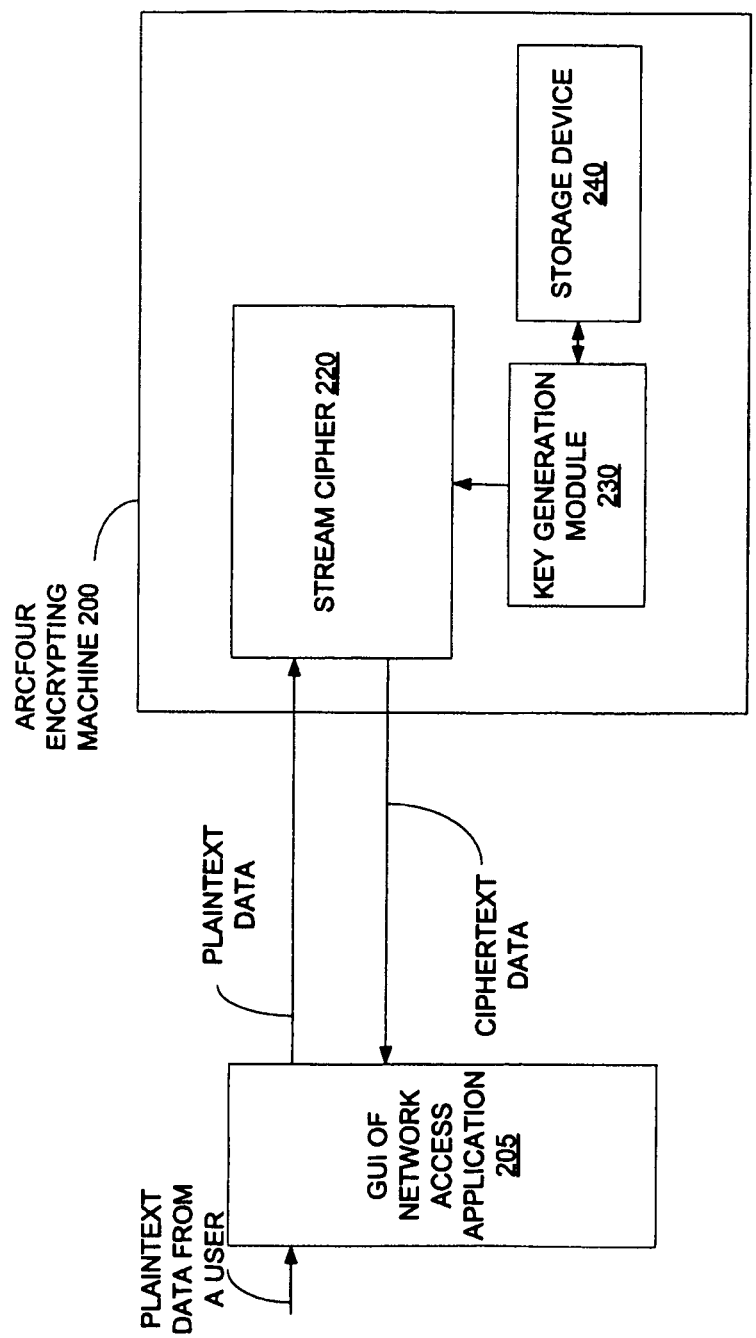
FIG. 2 illustrates a one embodiment of an arcfour encrypting machine.

FIG. 2 illustrates one embodiment of an arcfour encrypting machine. The arcfour encrypting machine 200 may be implemented using a computer system (e.g., a server, a personal computer, a personal digital assistant, etc.). One exemplary computer system usable to implement the arcfour encrypting machine 200 is shown in details in FIG. 4.

In some embodiments, the arcfour encrypting machine 200 includes a stream cipher 220, a key generator 230, and a storage device 240, which includes a computer readable storage medium. In some embodiments, a graphical user interface (GUI) of a network access application 205 is coupled to the stream cipher 220. The stream cipher 220 is coupled to the key generator 230, which is further coupled to the storage device 240. In some embodiments, the stream cipher 220 is further coupled to a network interface to receive data from a network (e.g., the Internet) and/or to send data to the network. Alternatively, the stream cipher 220 and the GUI 205 may be coupled to a removable storage medium (e.g., a flash drive, a CD-ROM, etc.) via the network interface.

As previously discussed, arcfour is conventionally rekeyed by using an iterative method, running over a key interpreted as a sequence of unsigned quantities in the range of 0 to 255. These quantities are, canonically, unsigned 8-bit byte values. The current state of the stream cipher 220 is stored in an array of 256 unsigned quantities in the range of 0 to 255, which is conventionally referred to as an S array. There are two additional unsigned quantities in the range of 0 to 255 that are used to index the S array. These two indices are referred to as i and j. The key generator 230 may initialize the S array to contain the sequence of integers from 0 to 255 in order (that is, S[0]=0, S[1]=1, . . . , and S[255]=255). Furthermore, the key generator 230 sets j to zero initially.

The key generator 230 extends the key scheduling process of arcfour to generate a set of substantially random and substantially unbiased keys. In one embodiment, the key generator 230 uses a first key to generate a 256-entry key array indirectly. In addition to, or as an alternative to, indirectly generating the 256-entry key array, the key generator 230 may mix the key array into the S array multiple times and/or in different ways. For instance, the key generator 230 may mix the key array into the S array in an iterative way. More details of some embodiments of extending the key scheduling process using the above approaches are discussed below.

In some embodiments, the key generator 230 constructs an array of 256 constant small integers (hereinafter, referred to as the constant array), instead of cyclically using an array of 256 integers in the range of 0 to 255 as the keys. The values of these small integers are within the same range as the range of desired outputs. For instance, the range of small integers is 0 to 255 for standard 8-bit arcfour. Extensions to 12 and 16 bits would work with a range of 0 to 4,095 and 0 to 65,535, respectively. Other sizes are possible in different embodiments. In some embodiments, the key generator 230 uses the first eight (8) bits of the binary representation of the absolute value of the sine of the values i+1, where i is between 0 and 255. Alternatively, the key generator 230 may select any arbitrary constants that are reasonably likely to be mostly unbiased and essentially random. This array helps to reduce the weakness of short key in conventional arcfour, in which the key is used cyclically.

In some embodiments, an externally provided key is combined with the array of constant small integers as a first stage of keying the generator 230. Note that the externally provided key is distinct from the keystream ultimately generated by the key generator 230. Next, the key generator 230 partitions the bits of the key into 8-bit subsets. In some embodiments, the bits are partitioned into all consecutive non-overlapping 8-bit sets, then every other bit, then every third bit, etc., until 256 8-bit quantities are generated. These quantities are exclusive-OR'ed (XOR'ed) with each corresponding entry in the constant array to produce a new array, which is hereinafter referred to as the C array.

In some embodiments, the key generator 230 iterates i through the sequence of 0 to 255, and for each value of i, performs the following operation:

$$j := (j + S[i] + K[i]) \text{ AND } 255$$

Then the entries S[i] and S[j] are swapped. After iterating i and keeping the low eight bits, adding S[i] to j and keeping the low eight bits, the indices i and j are set to zero again. Bytes are generated from this by:

$$i := (i+1) \text{ AND } 255$$

$$j := (j + S[i]) \text{ AND } 255$$

$$(S[i], S[j]) := (S[j], S[i])$$

$$\text{return } S[(S[i]+S[j]) \text{ AND } 255]$$

In some embodiments, the key generator 230 rotates each value in the C array left by (i % 7)+1, where "%" is the integer remainder function (the remainder when dividing i by 7), where the rotation may run through the values one to seven repeatedly. Then the key generator 230 may iterate i through the values of 0 to 255. Looking at each bit of C[i] from the lowest to the highest, if a respective bit is set, the key generator 230 swaps S[i] and S[i+k], where k is the index of the set bit, counting from 1. At this point, the key generator 230 is in its "prekeyed" state. The key generator 230 may either be used to begin generating a key stream, or the key generator 230 may be further keyed with a session key or nonce.

In some embodiments, adding a nonce to the state of the key generator 230 is accomplished by generating 256 8-bit quantities from the nonce (as for the key discussed above), and then iterating over these values, exchanging elements of the S array in accordance with the set bits of the 8-bit values (as for the second iteration through the C array discussed above). The keys generated according to the above approach may be used in arcfour encryption of plaintext data as discussed below.

Referring to FIG. 2, the GUI 205 of the network access application (e.g., a web browser, an electronic mail application, etc.) receives plaintext data from a user. The plaintext data may include a user name, an account number, a password, an electronic mail message, a file attachment, etc. The GUI 205 forwards the plaintext data to the arcfour encrypting machine 200 for encryption. Note that the GUI 205 of the network access application and the arcfour encrypting machine 200 may be implemented in the same computer system.

After receiving the plaintext data from the GUI 205, the stream cipher 220 uses the keys generated by the key generator 230 to encrypt the plaintext data to generate ciphertext data. Then the stream cipher 220 sends the ciphertext data to another device, such as a personal computer, a server, a cellular telephone, a storage medium, etc.

Likewise, the device receiving the ciphertext data may perform operations similar to those discussed above to decipher the ciphertext data. In some embodiments, the receiving device initializes another S array to store the same state as before, generates bytes, and performs XOR operations on the generated bytes with the ciphertext data.

Using the above approach, the keys generated are substantially random and unbiased. Unlike the conventional approach, the value of j does not evolve as a function of the sum of the key bytes. Because there is essentially no dependence of j and the keys in the ciphertext data generated, even if the first several output bytes of the ciphertext data are collected and analyzed, it is nevertheless difficult to reconstruct the keys. As such, the protection of data is significantly improved by the above approach.

Figure 3:
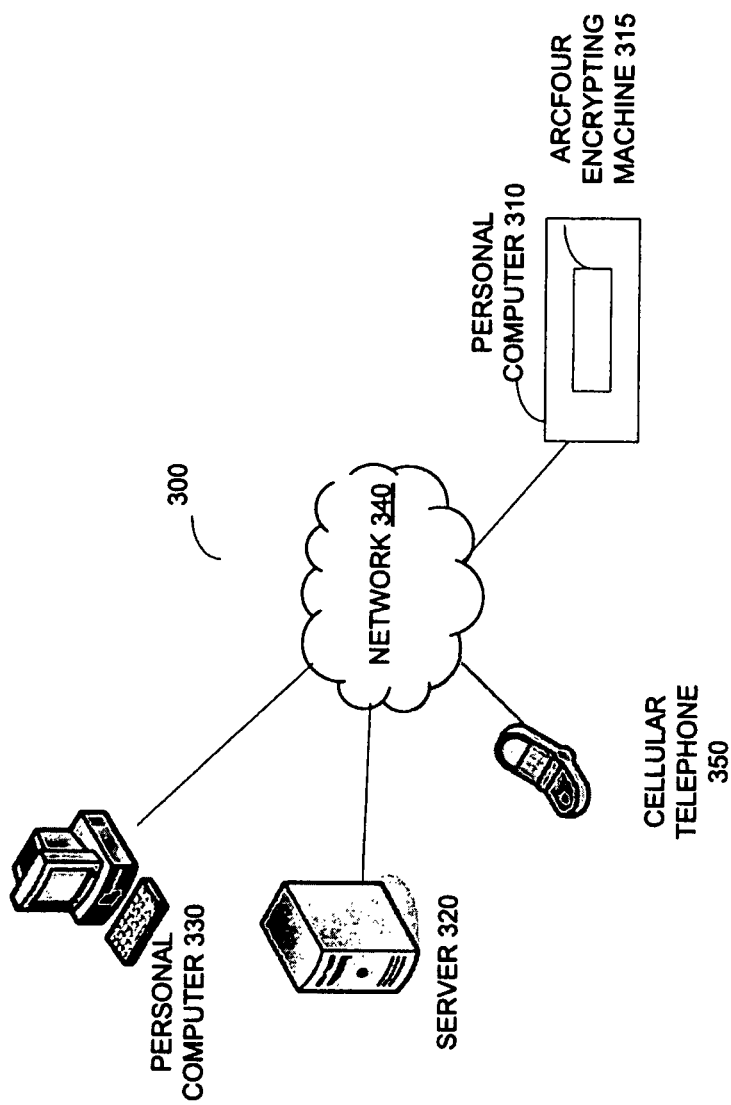
FIG. 3 illustrates one embodiment of a system in which embodiments of the present invention may be implemented.

FIG. 3 illustrates one embodiment of a system in which embodiments of the present invention may be implemented. The system 300 includes a first personal computer 310, a server 320, a second personal computer 330, and a cellular telephone 350, which are coupled to each other via a network 340. The network 340 may include various types of networks, such as a local area network (LAN), a wide area network (WAN), an intranet, the Internet, etc. Furthermore, the network 340 may include wirelined and/or wireless connections.

Note that any or all of the components of the system 300 and associated hardware may be used in various embodiments of the present invention. However, it can be appreciated that other configurations of the system 300 may include more or fewer devices than those discussed above. The personal computers 310 and 330, the server 320, and the cellular telephone 350 are illustrative examples of machines communicatively coupled to the network 340. One should appreciate that other types of machines and/or devices may communicatively couple to the network 340 in other embodiments, such as a laptop computer, a personal digital assistant, a smart phone, etc.

In some embodiments, the personal computer 310 receives plaintext data from a user via a GUI (e.g., the GUI of a browser). An arcfour encrypting machine 315 (such as the arcfour encrypting machine 200 illustrated in FIG. 2) is also implemented in the personal computer 310. The arcfour encrypting machine 315 may encrypt the plaintext data into ciphertext data using substantially random and unbiased keys generated from an extended key generation process. Details of some embodiments of the arcfour encrypting machine 315 and some embodiments of the extended key generation process have been discussed above. In some embodiments, the personal computer 310 sends the ciphertext data to one or more of the other machines (e.g., the server 320, the cellular telephone 350, etc.) via the network 340. For example, the server 320 may receive the ciphertext data from the personal computer 310. Then the server 320 may perform operations similar to those discussed above to decipher the ciphertext data. In some embodiments, the server 320 initializes another S array to store the same state of the stream cipher as before, generates bytes, and performs XOR operations on the generated bytes with the ciphertext data to decipher the ciphertext data into plaintext data.

Figure 4:
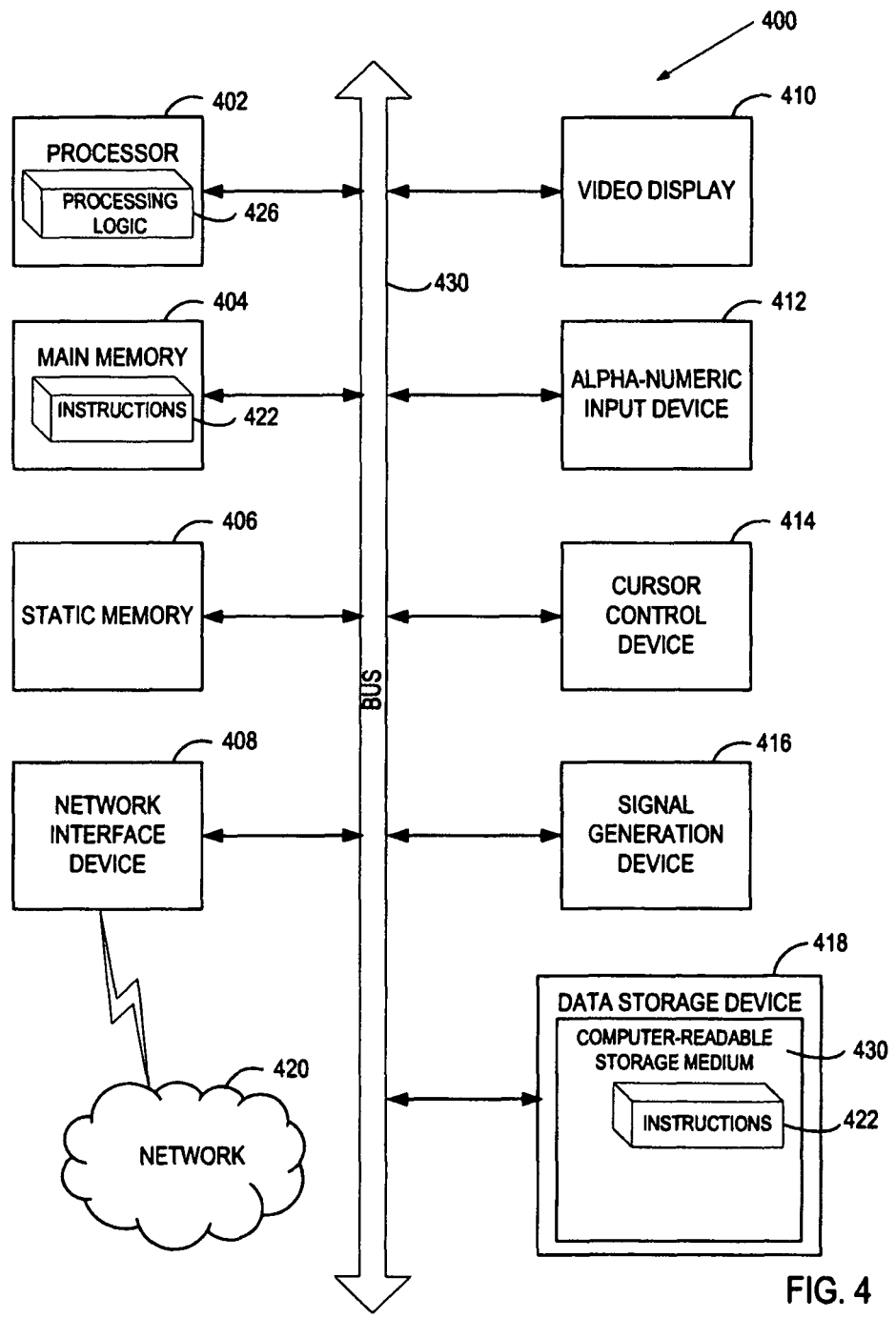
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a method and an apparatus to strengthen key schedule for arcfour have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   initializing, by a processing device, an S array of a predetermined size usable in a key generating process of arcfour encryption;
   using the S array and a second array in the key generating process to generate a plurality of keys, wherein the second array is generated based on a third array comprising integer values and a fourth array comprising bit values from a first key; and performing arcfour encryption on plaintext data using the plurality keys generated to output ciphertext data.

2. The method of claim 1, wherein using the S array and the second array comprises:
   using the first key to indirectly generate the fourth array.

3. The method of claim 1, wherein using the S array and the second array comprises:
   mixing the second array into the S array multiple times to generate the plurality of keys.

4. The method of claim 1, wherein the plurality of keys comprises substantially random and substantially unbiased keys.

5. The method of claim 1, wherein using the S array and the second array comprises:
   constructing the third array, the third array containing a plurality of constant integers within a predetermined range;
   constructing the fourth array by partitioning a plurality of bits of the first key into subsets to generate a plurality of quantities, each of the plurality of quantities having a predetermined number of bits; and
   performing an exclusive-OR (XOR) operation on each of the plurality of quantities with a corresponding entry in the second array of the plurality of constant integers to generate the second array.

6. The method of claim 1, wherein the plaintext data includes data received via a graphical user interface (GUI) of a network access application.

7. An apparatus comprising:
   a processing device; a key generator, executable by the processing device, to initialize an S array of a predetermined size, and to use the S array and a second array to generate a plurality of keys, wherein the second array is generated based on a third array comprising integer values and a fourth array comprising bit values from a first key; and
   a stream cipher, executable by the processing device, coupled to the key generator, to perform arcfour encryption on plaintext data using the plurality of keys generated to output ciphertext data.

8. The apparatus of claim 7, wherein the key generator uses the first key to indirectly generate the fourth array.

9. The apparatus of claim 7, wherein the key generator mixes the second array into the S array multiple times to generate the plurality of keys.

10. The apparatus of claim 7, wherein the plurality of keys comprise substantially random and substantially unbiased keys.

11. The apparatus of claim 7, wherein the key generator constructs the third array, the third array containing a plurality of constant integers within a predetermined range; the key generator further constructs the fourth array by partitioning a plurality of bits of the first key into subsets to generate a plurality of quantities, each of the plurality of quantities having a predetermined number of bits; and the key generator further performs an exclusive-OR (XOR) operation on each of the plurality of quantities with a corresponding entry in the second array of the plurality of constant integers to generate the second array.

12. The apparatus of claim 7, further comprising a network access application having a graphical user interface (GUI) to receive the plaintext data from a user.

13. A system comprising the apparatus of claim 7, further comprising:
   a first server on which the key generator and the stream cipher are run.

14. The system of claim 13, further comprising a second server, wherein the first server sends the ciphertext data to the second server via a network.

15. A non-transitory computer-readable storage medium embodying instructions that, when executed by a processing device, will cause the processing device to perform a method comprising: initializing, by the processing device, an S array of a predetermined size usable in a key generating process of arcfour encryption; using the S array and a second array in the key generating process to generate a plurality of keys, wherein the second array is generated based on a third array comprising integer values and a fourth array comprising bit values from a first key; and performing arcfour encryption on plaintext data using the plurality of keys generated to output ciphertext data.

16. The non-transitory computer-readable storage medium of claim 15, wherein using the S array and the second array comprises: using the first key to indirectly generate the fourth array.

17. The non-transitory computer-readable storage medium of claim 15, wherein using the S array and the second array comprises:
   mixing the second array into the S array multiple times to generate the plurality of keys.

18. The non-transitory computer-readable storage medium of claim 15, wherein the plurality of keys comprises substantially random and substantially unbiased keys.

19. The non-transitory computer-readable storage medium of claim 15, wherein using the S array and the second array comprises:
   constructing the third array, the third array containing a plurality of constant integers within a predetermined range;
   constructing the fourth array by partitioning a plurality of bits of the first key into subsets to generate a plurality of quantities, each of the plurality of quantities having a predetermined number of bits; and
   performing an exclusive-OR (XOR) operation on each of the plurality of quantities with a corresponding entry in the second array of the plurality of constant integers to generate the second.

20. The non-transitory computer-readable storage medium of claim 15, wherein the plaintext data includes data received via a graphical user interface (GUI) of a network access application.

* * * * *